(12) United States Patent
Smithanik et al.

(10) Patent No.: US 10,971,969 B2
(45) Date of Patent: Apr. 6, 2021

(54) LOW-PROFILE ROTOR FOR MAGNETIC BEARING ASSEMBLIES

(71) Applicant: SKF Canada Limited, Scarborough (CA)

(72) Inventors: Jeffrey Russel Smithanik, Calgary (CA); Daren Paul Tremaine, Silverton (CA); David Buechler, Calgary (CA)

(73) Assignee: SKF CANADA LIMITED, Scarborough (CA)

( * ) Notice: Subject to any disclaimer, the term of this patent is extended or adjusted under 35 U.S.C. 154(b) by 7 days.

(21) Appl. No.: 16/341,807

(22) PCT Filed: Oct. 20, 2017

(86) PCT No.: PCT/CA2017/051255
§ 371 (c)(1),
(2) Date: Apr. 12, 2019

(87) PCT Pub. No.: WO2018/072033
PCT Pub. Date: Apr. 26, 2018

(65) Prior Publication Data
US 2019/0319510 A1    Oct. 17, 2019

Related U.S. Application Data

(60) Provisional application No. 62/410,430, filed on Oct. 20, 2016.

(51) Int. Cl.
*H02K 7/09* (2006.01)
*H02K 11/21* (2016.01)
(Continued)

(52) U.S. Cl.
CPC .......... *H02K 7/09* (2013.01); *F16C 32/0474* (2013.01); *H02K 1/22* (2013.01); *H02K 7/14* (2013.01);
(Continued)

(58) Field of Classification Search
CPC ....................................................... H02K 7/09
See application file for complete search history.

(56) References Cited

U.S. PATENT DOCUMENTS 5,254,895 A * 10/1993 Koizumi ................ G11B 19/20
310/156.06
5,463,511 A * 10/1995 Nakano ............... G11B 19/2009
360/98.07
(Continued)

FOREIGN PATENT DOCUMENTS

WO    2006081488 A2    8/2006

OTHER PUBLICATIONS

International Search Report and Written Opinion of the International Searching Authority in PCT/CA2017/051255 dated Jan. 15, 2018.

*Primary Examiner* — Dang D Le
(74) *Attorney, Agent, or Firm* — J-TEK Law PLLC; Scott T. Wakeman; Mark A. Ussai

(57) ABSTRACT

A rotor is for angularly displacing a work piece about a central axis and includes an annular, central axial portion centered about the axis and having opposing, first and second axial ends and inner and outer circumferential surfaces. An outer radial portion extends radially-outwardly from the first axial end of the central portion such that an outer generally annular cavity is at least partially defined between the central portion and the outer radial portion. Further, an inner radial portion extends generally radially-inwardly from the second axial end of the central portion such that an inner generally annular cavity is at least partially defined between the central portion and the inner radial portion. One or more motor stators are disposed at least partially within the outer or inner cavity and are each (Continued)

configured to angularly displace the rotor about the central axis, and preferably contactlessly drives the rotor.

21 Claims, 6 Drawing Sheets

(51) Int. Cl.
    *F16C 32/04*          (2006.01)
    *H02K 1/22*           (2006.01)
    *H02K 7/14*           (2006.01)

(52) U.S. Cl.
    CPC .......... *H02K 11/21* (2016.01); *F16C 2380/26* (2013.01)

(56) References Cited

U.S. PATENT DOCUMENTS

| | | | |
|---|---|---|---|
| 5,550,413 A | | 8/1996 | Bemus et al. |
| 6,069,429 A | * | 5/2000 | Yamamoto ............ F16C 17/107 |
| | | | 310/90 |
| 6,545,378 B2 | * | 4/2003 | Chen .................... F16C 17/026 |
| | | | 310/67 R |
| 8,264,110 B2 | * | 9/2012 | Song ....................... F16C 17/02 |
| | | | 310/67 R |
| 8,270,563 B2 | | 9/2012 | Harris et al. |
| 8,754,554 B2 | * | 6/2014 | Tamaoka ............... H02K 1/146 |
| | | | 310/67 R |
| 2004/0174079 A1 | | 9/2004 | Izraelev |
| 2014/0270051 A1 | | 9/2014 | Smithanik et al. |

\* cited by examiner

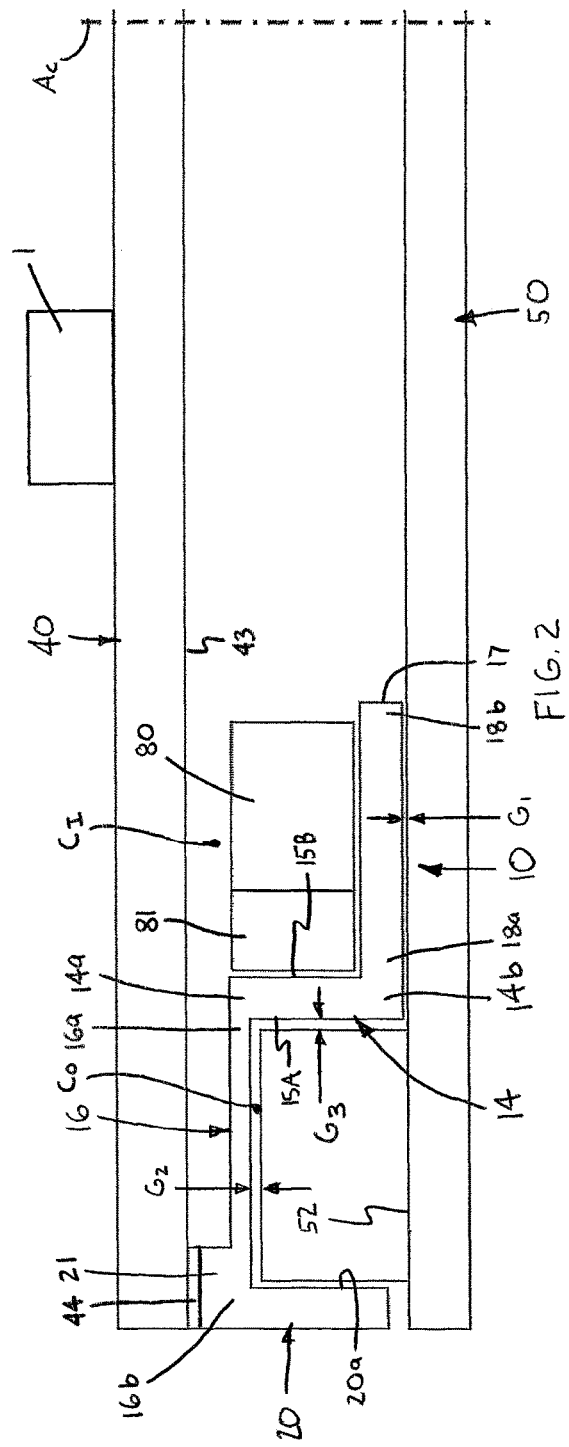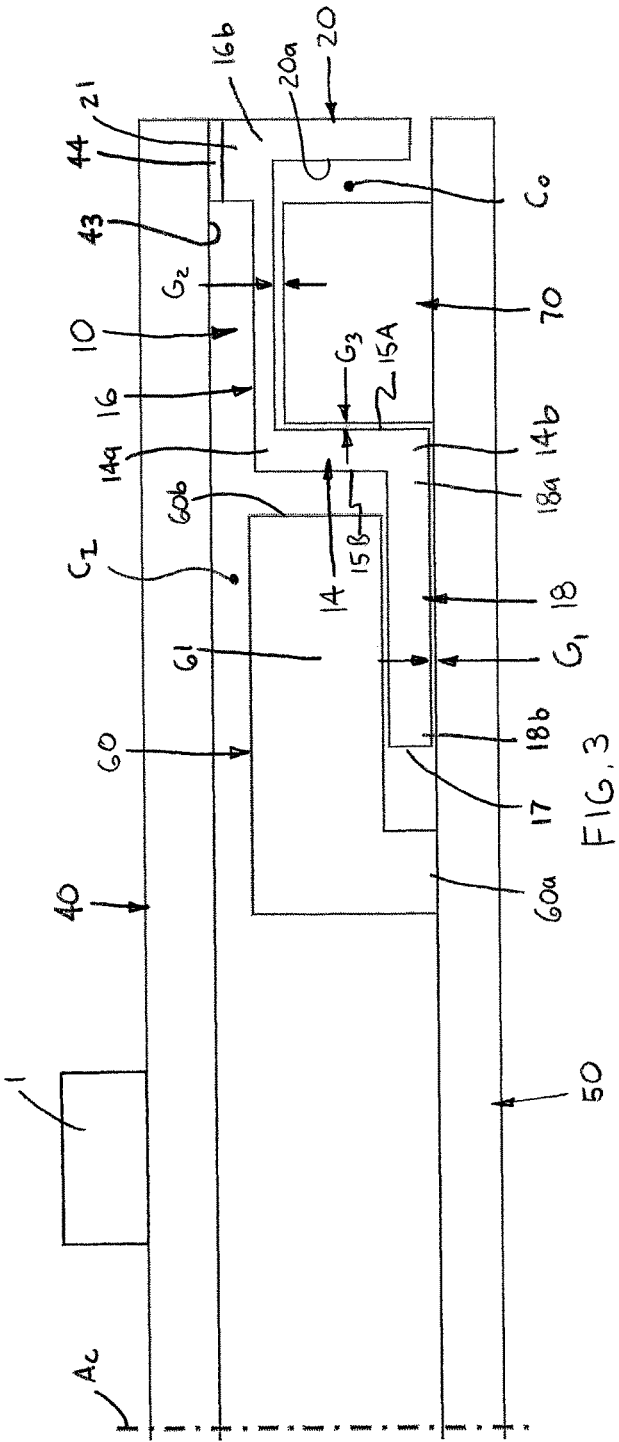

LOW-PROFILE ROTOR FOR MAGNETIC BEARING ASSEMBLIES

BACKGROUND OF THE INVENTION

The present invention relates to magnetic bearing assemblies, and more particularly to rotors used with magnetic bearings assemblies.

Magnetic bearings are known and typically include a magnetic stator and a rotor. Due to relatively large surface areas required for applying magnetic forces, typical magnetic bearing assemblies are not used in industries where space is limited and such applications have required the use of conventional rolling element bearings.

SUMMARY OF THE INVENTION

In one aspect, the present invention is a rotor for angularly displacing a work piece about a central axis. The rotor comprises a generally annular, central axial portion generally centered about the axis and having opposing, first and second axial ends and inner and outer circumferential surfaces. An outer radial portion extends generally radially-outwardly from the first axial end of the central portion such that an outer generally annular cavity is at least partially defined between the central portion and the outer radial portion. Further, an inner radial portion extends generally radially-inwardly from the second axial end of the central portion such that an inner generally annular cavity is at least partially defined between the central portion and the inner radial portion.

In another aspect, the present invention is a device for angularly displacing a work piece about a central axis. The device comprises a rotor including a generally annular, central axial portion generally centered about the axis and having opposing, first and second axial ends and inner and outer circumferential surfaces. An outer radial portion extends generally radially-outwardly from the first axial end of the central portion such that an outer generally annular cavity is at least partially defined between the central portion and the outer radial portion. An inner radial portion extends generally radially-inwardly from the second axial end of the central portion such that an inner generally annular cavity is at least partially defined between the central portion and the inner radial portion. Further, at least one motor stator is disposed at least partially within the outer cavity or inner cavity and is configured to angularly displace the rotor about the central axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is broken-away portion of FIG. 1;

FIG. 3 is another broken-away portion of FIG. 1;

DETAILED DESCRIPTION OF THE INVENTION

Figure 1:
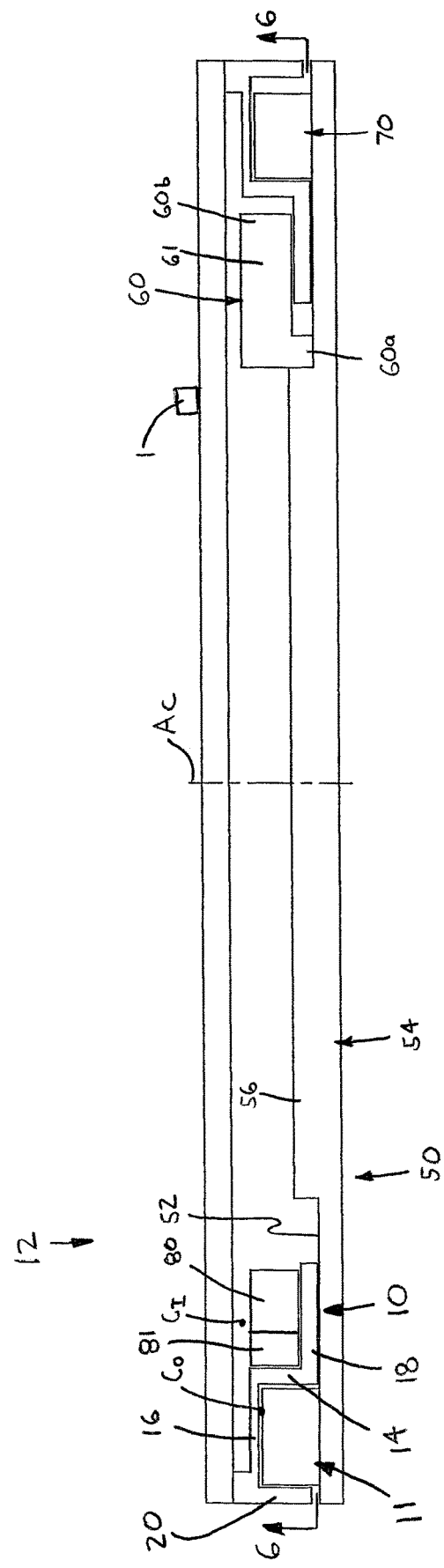
FIG. 1 is an axial cross-sectional view of a device having a rotor in accordance with the present invention.
Figure 4:
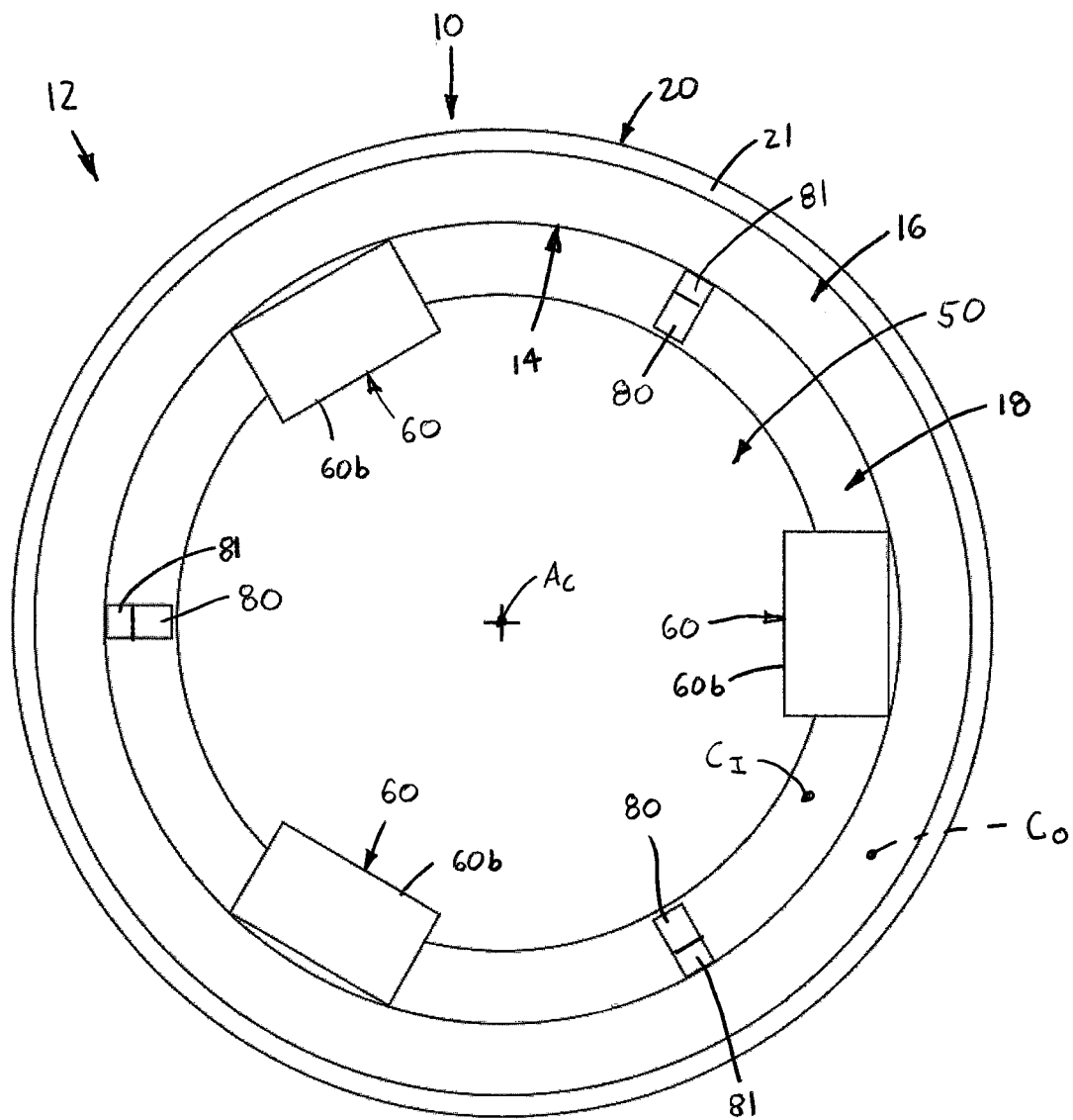
FIG. 4 is a top plan view of the device.
Figure 5:
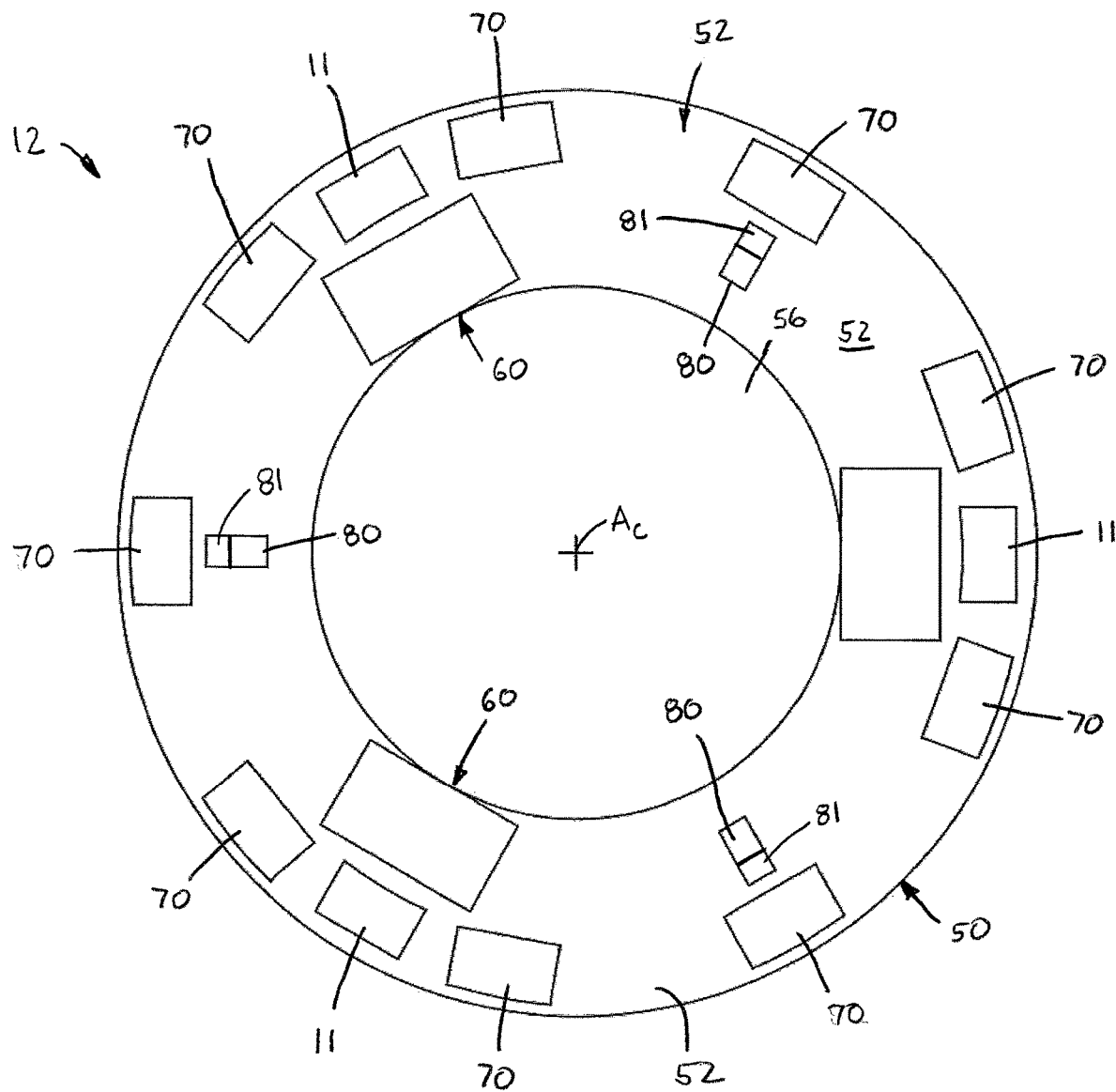
FIG. 5 is another top plan view of the device, shown without the rotor.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a rotor 10 of a compact device 12 for angularly displacing or/and positioning a work piece 1 about a central axis $A_C$, the device 12 further comprising at least one and preferably a plurality of motor stators 70 for angularly displacing the rotor 10 about the axis $A_C$. In one preferred application, the compact device 12 including the rotor 10 is used to process or fabricate semi-conductor wafers (i.e., the workpiece(s) 1), but may be used in any other appropriate application. The rotor 10 is generally annular and basically comprises a central axial portion 14 generally centered about the axis $A_C$, an outer radial portion 16, an inner radial portion 18, and preferably also comprises an outer axial portion 20. The central axial portion 14 is generally annular, most preferably generally circular cylindrical, and has opposing, first and second axial ends 14a, 14b and inner and outer circumferential surfaces 15A, 15B. The outer radial portion 16 is preferably formed as a generally circular disk or washer and has an inner radial end 16a connected with the rotor central portion 14 and an opposing outer radial end 16b. The rotor outer radial portion 16 extends generally radially-outwardly from the first axial end 14a of the central portion 14 such that an outer generally annular cavity $C_O$ is at least partially defined between the central axial portion 14 and the outer radial portion 16.

Further, the inner radial portion 18 is also preferably formed as a generally circular disk or washer and has an outer end 18a connected with the rotor central portion 14 and an inner radial end 18b spaced radially outwardly from and extending circumferentially about the central axis $A_C$. As such, the inner radial portion 18 provides a central bore 17 extending through the rotor 10, for reasons described below. The rotor inner radial portion 18 extends generally radially-inwardly from the second axial end 14b of the rotor central portion 14, such that an inner generally annular cavity $C_I$ is at least partially defined between the central portion 14 and the inner radial portion 18. Each one of the rotor outer and inner cavities $C_I$, $C_O$ is sized to receive at least a portion of at least one of the motor stator 70, a radial position sensor 81, an axial position sensor 80, an angular speed and position sensor 84, a radial bearing 11 and/or an axial bearing 60, or any other components of the device 12 as described in further detail below. Thereby, the device 12 is generally "axially compact", as discussed in greater detail hereafter.

As best shown in FIGS. 1-3, the rotor outer axial portion 20 is preferably generally circular cylindrical, extends generally axially from the outer end 16b of the outer radial portion 16 and is spaced radially outwardly from, and disposed generally coaxially, about the rotor central axial portion 14. As such, the rotor outer cavity $C_O$ is bounded radially between the rotor central axial portion 14 and the rotor outer axial portion 20. Preferably, all of the rotor sections 14, 16, 18 and 20 are integrally connected or formed such that the rotor 10 is of one-piece construction with generally S-shaped axial cross-sectional shapes, but may alternatively be formed of two or more permanently or removably attached pieces.

Still referring to FIGS. 1-3, the device 12 further comprises a work piece holder or "chuck" 40 connected with the rotor 10 and configured to retain at least one work piece 1 during angular displacement of the rotor 10 about the central axis $A_C$. Preferably, the rotor outer radial portion 16 is connectable to the work piece holder 40, and most preferably the holder 40 is attached to an annular shoulder 21 formed between the rotor outer radial portion 16 and the rotor outer axial portion 20. However, the holder/chuck 40 may be coupled with another portion of the rotor 10, such as the inner axial portion 14 or the inner radial portion 18. Further, the holder/chuck 40 preferably has a generally circular, generally flat upper surface 42 upon which the one or more work piece(s) 1 are disposable, but may be otherwise formed to receive and/or retain the work piece(s) 1. Additionally, an elastomeric layer 44, such as a flat circular gasket or an O-ring, is preferably disposed between the holder lower surface 43 and the shoulder 21 so as to damp vibrations, etc., as best shown in FIGS. 2 and 3.

Figure 6:
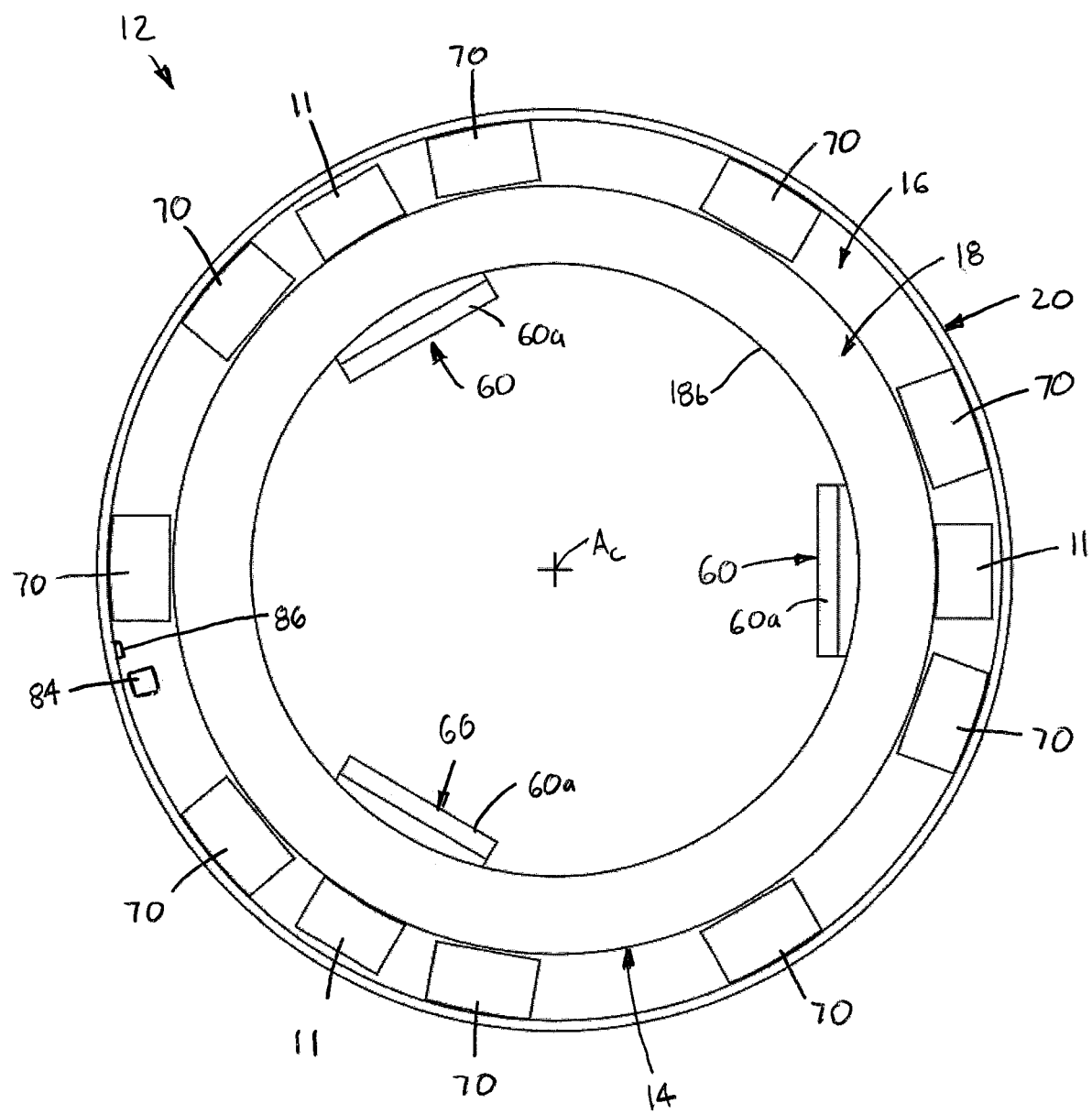
FIG. 6 is a view through line 6-6 of FIG. 1.
Figure 7:
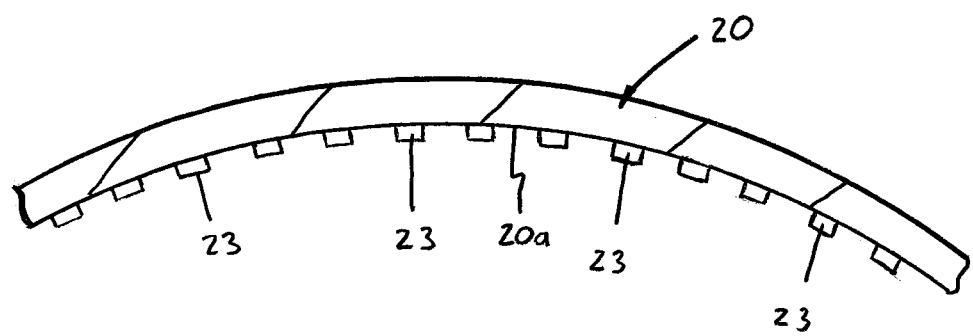
FIG. 7 is a broken-away, enlarged radial cross-sectional view of an outer axial portion of the rotor, showing a plurality of ferromagnetic teeth.

Referring now to FIGS. 1-3, 5 and 6, the rotor 10 is configured to be rotatably displaced about the central axis $A_C$ by one or preferably a plurality of the motor stators 70, spaced circumferentially about the central axis $A_C$ to form a stator assembly, which is preferably configured to contactlessly drive the rotor 10, such as for example, by the principles of "switched reluctance". As such, the rotor 10, preferably the rotor outer axial portion 20, the rotor central portion 14 or/and the rotor outer radial portion 16, has at least one switch element, magnetic pole or ferromagnetic section and the motor stator 70 is configured to exert magnetic force on the rotor switch element, the magnetic pole or the ferromagnetic section so as to angularly displace the rotor 10 about the central axis $A_C$. Most preferably, the rotor outer axial portion 20 includes a plurality of ferromagnetic teeth 23 extending inwardly from an inner circumferential surface 21a of the axial portion 20 and spaced circumferentially about the central axis $A_C$, as depicted in FIG. 7. Further, each motor stator 70 is preferably disposed in the outer cavity $C_O$ and is configured to exert magnetic force on each one of the teeth 23 to thereby exert torque on the rotor 10 so as to angularly displace the rotor about the central axis $A_C$. Alternatively, the teeth may be provided on the rotor central axial portion 14 or even on either of the rotor outer and inner radial portions 16, 18, respectively. However, the motor stator 70 may be otherwise constructed to contactlessly rotatably drive the rotor 10 or even, although not preferred, be configured to drive the rotor 10 directly or through a transmission element or assembly (none shown), such as for example, a belt and pulley, a plurality of gears, etc.

Referring again to FIGS. 1-6, the device 12 further comprises a base 50 having an upper surface 52, which preferably includes a generally circular body 54 with a raised central portion 56. The motor stator(s) 70 are each preferably disposed on the base upper surface 52 and within the rotor outer cavity $C_O$. Preferably, the device 12 further comprises at least one axial actuator 60 disposed on the base 50 and at least partially within one of the inner and outer rotor cavities $C_I$, $C_O$. The at least one axial actuator 60 is configured to maintain an axial gap $G_1$ between the rotor 10 and the base 50. Most preferably, the device 12 includes a plurality of axial actuators 60 spaced circumferentially about the central axis $A_C$, each actuator 60 having a first end 60a disposed on the base upper surface 52 and a second end 60a spaced axially from the upper surface 52. Further, a portion 61 of the axial actuator 60 is preferably disposed within the rotor inner cavity $C_I$ such that the rotor inner radial portion 18 is generally disposed between the base 50 and the axial actuator portion 61.

Each axial actuator 60 is preferably an active electromagnetic actuator or a hybrid actuator including both electromagnets and permanent magnet(s), but may include only one or more permanent magnet actuators. In any case, the axial actuator(s) 60 are configured to maintain the axial gap $G_1$ by exerting magnetic force on the rotor 10, preferably the inner radial portion 18, so as to prevent contact between the rotor 10 and the base 50 and between the rotor 10 and the axial actuator(s) 60. Further, the axial actuator(s) 60 also maintain an outer axial gap $G_2$ between the rotor outer radial portion 16 and any components, such as the motor 11, located within the outer cavity $C_O$ and between the outer radial portion 16 and the base 50.

Referring to FIGS. 1, 3, 5 and 6, the device 12 also further comprises a plurality of radial actuators 11 disposed on the base 50 and at least partially within the rotor inner cavity $C_I$ or the rotor outer cavity $C_O$. The radial actuators 11 are configured to center the rotor 10 about the central axis $A_C$ so as to maintain an annular gap $G_3$ between the rotor central axial portion and the motor 70, and any other components located adjacent to the rotor central axial portion 14. Each radial actuator 11 is preferably an active electromagnetic actuator or a hybrid actuator including both electromagnets and permanent magnets, but may include only one or more permanent magnet actuators. In any case, the radial actuator(s) 11 are configured to maintain the annular gap $G_3$ by exerting magnetic force on the rotor 10, preferably the inner axial portion 14, so as to prevent contact between the rotor 10 and the motor stator 70 (and other components) and between the rotor 10 and the radial actuator(s) 11.

Referring now to FIGS. 1, 2, 4 and 5, the device 12 also preferably further comprises one or more radial position sensors 81 and one or more axial position sensors 80, each sensor 81, 80 being disposed at least partially within the rotor inner or outer cavity $C_I$, $C_O$. Each radial position sensor 81 is configured to sense the radial position of the rotor 10 relative to the stationary central axis $A_C$ in a plane which is perpendicular to the central axis $A_C$, more specifically measuring the gap $G_3$. Each axial sensor 80 is configured to sense the axial position of the rotor 10 or a portion thereof, along the central axis $A_C$, or more specifically to measure the gap $G_2$. Further, the device 12 also preferably includes one or a plurality of angular speed and position sensors 84. Each angular speed and position sensor 84 is configured to detect the angular speed and/or angular position of the rotor 10 about the central axis $A_C$, more specifically by detecting a single target feature 86 (e.g., a tooth, a magnetic node, etc.), which is preferably further included in the device 12, once every revolution of the rotor 10, as indicated in FIG. 6. Preferably, the device 12 includes at least one and preferably a plurality of targets 86 disposed on the rotor 10, such that the radial position sensor(s) 81, the axial position sensor(s) 80, or/and the angular speed and position sensors 84 are configured to detect one or more of the targets 86 to determine radial position, axial position or angular speed or angular position of the rotor 10 with respect to the central axis $A_C$. Specifically, the speed sensors 84 are preferably arranged to detect the teeth 23 (FIG. 7) formed on the rotor outer axial portion 20, such that the teeth 23 function generally as an encoder in addition to being driven by the motor stator(s) 70.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A rotor for angularly displacing a work piece about a central axis, the rotor comprising:
   a generally annular, central axial portion generally centered about the axis and having opposing, first and second axial ends and inner and outer circumferential surfaces;
   an outer radial portion extending generally radially-outwardly from the first axial end of the central portion such that an outer generally annular cavity is at least partially defined between the central portion and the outer radial portion;
   an inner radial portion extending generally radially-inwardly from the second axial end of the central portion such that an inner generally annular cavity is at least partially defined between the central portion and the inner radial portion; and
   a work piece holder attached to the outer radial portion and configured to retain at least one work piece during angular displacement of the rotor about the central axis.

2. The rotor as recited in claim 1 wherein each one of the outer and inner cavities is sized to receive at least a portion of at least one of an actuator, a motor stator, a position sensor, a speed sensor, a radial bearing and an axial bearing.

3. The rotor as recited in claim 1 wherein the rotor is configured to be rotatably displaced about the central axis by a motor stator.

4. The rotor as recited in claim 3 wherein at least one of the central portion, the outer radial portion or the inner radial portion has et at least one magnetic pole or at least one ferromagnetic section.

5. The rotor as recited in claim 1 wherein:
   the outer radial portion has an inner radial end connected with the central portion and an opposing outer radial end; and
   the rotor further comprises an outer axial portion extending generally axially from the outer end of the outer radial portion and spaced radially outwardly from and disposed generally coaxially about the central axial portion such that the outer cavity is bounded between the central axial portion and the outer axial portion.

6. The rotor as recited in claim 1 wherein the inner radial portion has an outer end connected with the central portion and an inner radial end spaced radially outwardly from and extending circumferentially about the central axis such that a central bore extends through the rotor.

7. The rotor as recited in claim 1 wherein the workpiece holder has a generally circular, generally flat upper surface upon which at least one work piece is disposable.

8. The rotor as recited in claim 1 further comprising a base having an upper surface, the rotor inner radial portion being disposed adjacent to the base upper surface and the rotor outer radial portion being spaced axially from the base upper surface such that inner radial portion is located axially between the base upper surface and the outer radial portion.

9. A device for angularly displacing a work piece about a central axis, the device comprising:
   a rotor including a generally annular, central axial portion generally centered about the axis and having opposing, first and second axial ends and inner and outer circumferential surfaces, an outer radial portion extending generally radially-outwardly from the first axial end of the central portion such that an outer generally annular cavity is at least partially defined between the central portion and the outer radial portion, and an inner radial portion extending generally radially-inwardly from the second axial end of the central portion such that an inner generally annular cavity is at least partially defined between the central portion and the inner radial portion;
   a work piece holder attached to the outer radial portion of the rotor and configured to retain at least one work piece during angular displacement of the rotor about the central axis; and
   at least one motor stator disposed at least partially within the outer cavity or the inner cavity and configured to angularly displace the rotor about the central axis.

10. The device as recited in claim 9 wherein the motor stator is configured to contactlessly drive the rotor.

11. The device as recited in claim 9 wherein:
    the rotor has at least one magnetic pole or at least one ferromagnetic section; and
    the motor stator is configured to exert magnetic force on the rotor switch element, the magnetic pole or the ferromagnetic section so as to angularly displace the rotor about the central axis.

12. The device as recited in claim 9 further comprising:
    a base having an upper surface, the motor being disposed on the base; and
    at least one axial actuator disposed on the base and at least partially within one of the inner and outer rotor cavities, the at least one axial actuator being configured to maintain an axial gap between the rotor and the base.

13. The device as recited in claim 12 wherein the at least one axial actuator has a first end disposed on the base upper surface and a second end spaced axially from the upper surface, a portion of the axial actuator being disposed within the rotor inner cavity such that the rotor inner radial portion is generally disposed between the base and the axial actuator portion.

14. The device as recited in claim 9 further comprising a plurality of radial actuators disposed at least partially in the inner cavity or in the outer cavity and configured to center the rotor about the central axis so as to maintain an annular gap between the rotor central axial portion and the motor.

15. The device as recited in claim 9 further comprising at least one of:
    at least one radial position sensor disposed at least partially within one of the rotor inner and outer cavities and configured to sense the angular position of the rotor about the central axis; and at least one axial position sensor disposed at least partially within one of the rotor inner and outer cavities and configured to sense the axial position of the rotor along the central axis.

16. The device as recited in claim 15 further comprising at least one target disposed on the rotor, at least one of the radial position sensor and the axial position sensor being configured to detect the target.

17. The device as recited in claim 9 wherein each one of the outer and inner cavities is sized to receive at least a portion of at least one of an actuator, a motor, a position sensor, a speed sensor, a radial bearing and an axial bearing.

18. The device as recited in claim 9 wherein:
the rotor outer radial portion has an inner radial end connected with the central portion and an opposing outer radial end; and
the rotor further includes an outer axial portion extending generally axially from the outer end of the outer radial portion and spaced radially outwardly from and disposed generally coaxially about the central axial portion such that the outer cavity is bounded between the central axial portion and the outer axial portion.

19. The device as recited in claim 18 wherein:
the outer axial portion of the rotor has an inner circumferential surface and a plurality of ferromagnetic teeth extending inwardly from the inner circumferential surface and spaced circumferentially about the central axis; and
the motor stator is disposed within the outer cavity and is configured to exert magnetic force on each one of the teeth to angularly displace the rotor about the central axis.

20. The device as recited in claim 9 wherein the inner radial portion has an outer end connected with the central portion and an inner radial end spaced radially outwardly from and extending circumferentially about the central axis such that a central bore extends through the rotor.

21. The device as recited in claim 20 further comprising a base and at least one of component disposed on the base and extending through the rotor bore so as to be disposed partially within the inner cavity, the at least one component being one of an actuator, a motor, a position sensor, a speed sensor, a radial bearing and an axial bearing.

* * * * *